United States Patent
Cummings

(10) Patent No.: US 12,026,645 B2
(45) Date of Patent: Jul. 2, 2024

(54) WELDING DATA TRACKING PLATFORM AND INTERFACE

(71) Applicant: WeldChain LLC, The Woodlands, TX (US)

(72) Inventor: Christopher Brendan Cummings, Spring, TX (US)

(73) Assignee: WeldChain LLC, The Woodlands, TX (US)

( * ) Notice: Subject to any disclaimer, the term of this patent is extended or adjusted under 35 U.S.C. 154(b) by 0 days.

(21) Appl. No.: 17/724,960

(22) Filed: Apr. 20, 2022

(65) Prior Publication Data

US 2022/0342392 A1 Oct. 27, 2022

Related U.S. Application Data

(60) Provisional application No. 63/302,291, filed on Jan. 24, 2022, provisional application No. 63/178,747, filed on Apr. 23, 2021.

(51) Int. Cl.
*G06Q 10/0631* (2023.01)
*B23K 37/00* (2006.01)
*G05B 19/418* (2006.01)
*G06Q 10/0639* (2023.01)

(52) U.S. Cl.
CPC ........ *G06Q 10/06311* (2013.01); *B23K 37/00* (2013.01); *G05B 19/41875* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 2010/0088247 | A1* | 4/2010 | Allin | G06Q 50/08 705/344 |
| 2010/0217440 | A1* | 8/2010 | Lindell | G05B 19/41875 700/275 |
| 2011/0087517 | A1* | 4/2011 | Abbott | G06Q 10/0635 703/7 |
| 2015/0129581 | A1* | 5/2015 | Cole | B23K 9/1087 219/60 A |
| 2016/0339534 | A1* | 11/2016 | Tamm | B23K 9/325 |
| 2017/0076365 | A1* | 3/2017 | D'Souza | G06Q 50/163 |
| 2018/0029154 | A1* | 2/2018 | Rajagopalan | B23K 9/0286 |
| 2018/0032066 | A1* | 2/2018 | Enyedy | G06Q 50/08 |
| 2022/0134464 | A1* | 5/2022 | Jiao | B23K 28/006 219/124.34 |

OTHER PUBLICATIONS

Welding Traceability and Weld Mapping with Sirfull Welding, https://sirfull-welding.com/en/actualite/weld-mapping-tracking-and-traceability-of-welds-with-sirfull-welding/, Feb. 1, 2021 (Year: 2021).*
PCT Application No. PCT/US22/25733, International Search Report and Written Opinion, mailed Sep. 21, 2022, 12 pgs.

* cited by examiner

Primary Examiner — John J Norton
(74) Attorney, Agent, or Firm — Fletcher Yoder P.C.

(57) ABSTRACT

Methods, devices, and platforms related to welds. More particularly a device includes a processor that when in operation receives a first signal indicative of completion of action undertaken with respect to a weld. The processor of the device when in operation generates a data log corresponding to receipt of the first signal for addition to a set of one or more previous data logs that correspond to the weld.

16 Claims, 8 Drawing Sheets

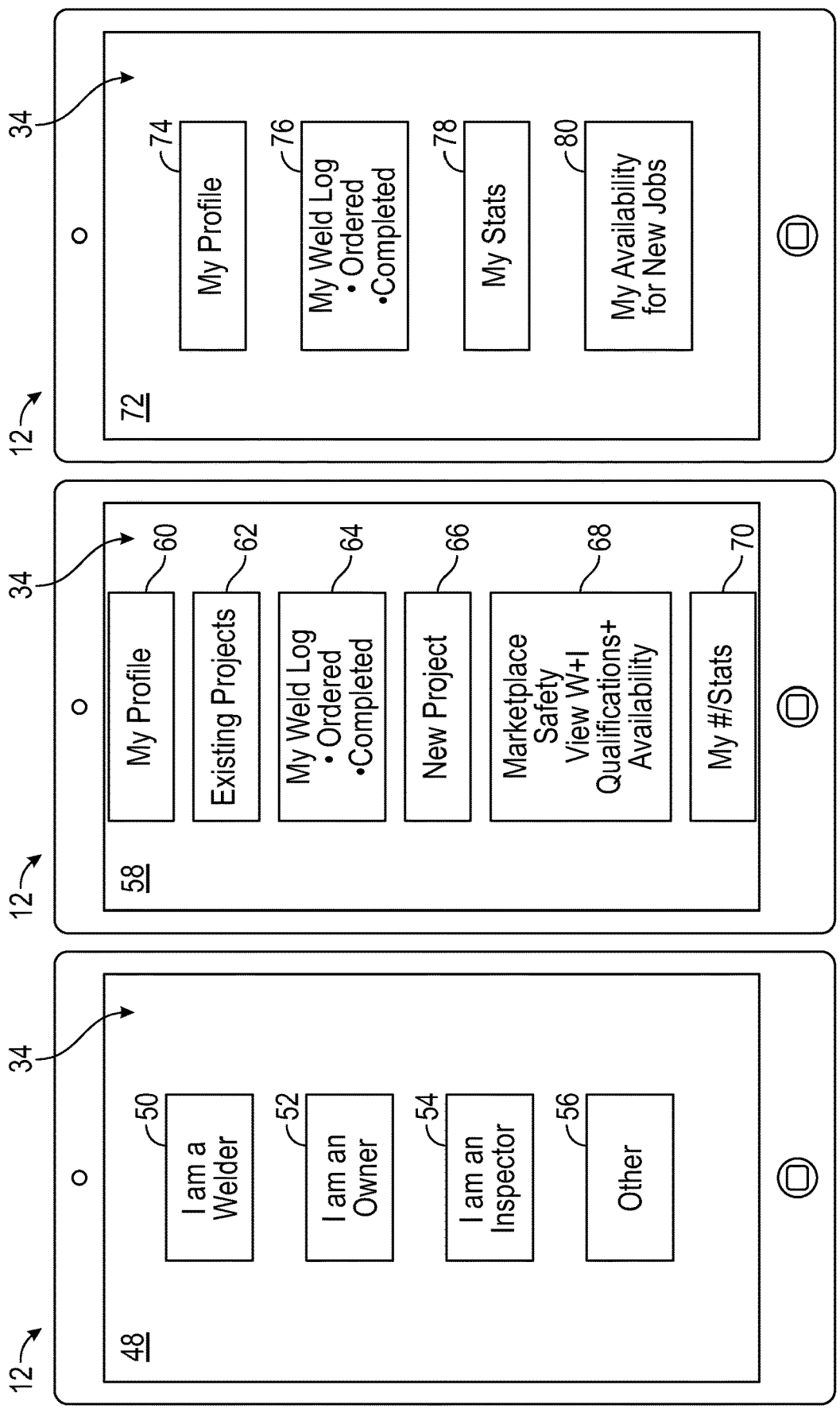

| | Welds (New/Inspection/Repair) | $ (Automated Payment Upon Verification of Conditions Precedent) | Jobs/Marketplace | Specialized Stats/Performance Reports |
|---|---|---|---|---|
| Owner - Facing | ✓ | ✓ | ✓ | ✓ |
| Welder - Facing | ✓ | ✓ | ✓ | ✓ |
| Inspector/Tester Facing | ✓ | ✓ | ✓ | ✓ |
| Other/ (Regulators, etc.) | ✓ | | | ✓ |

FIG. 7

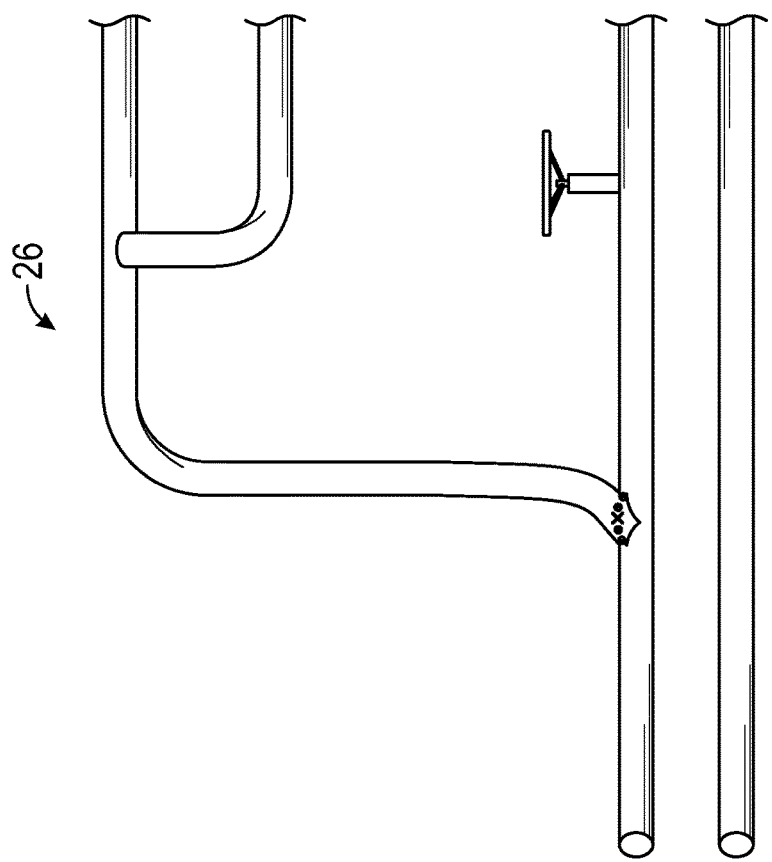
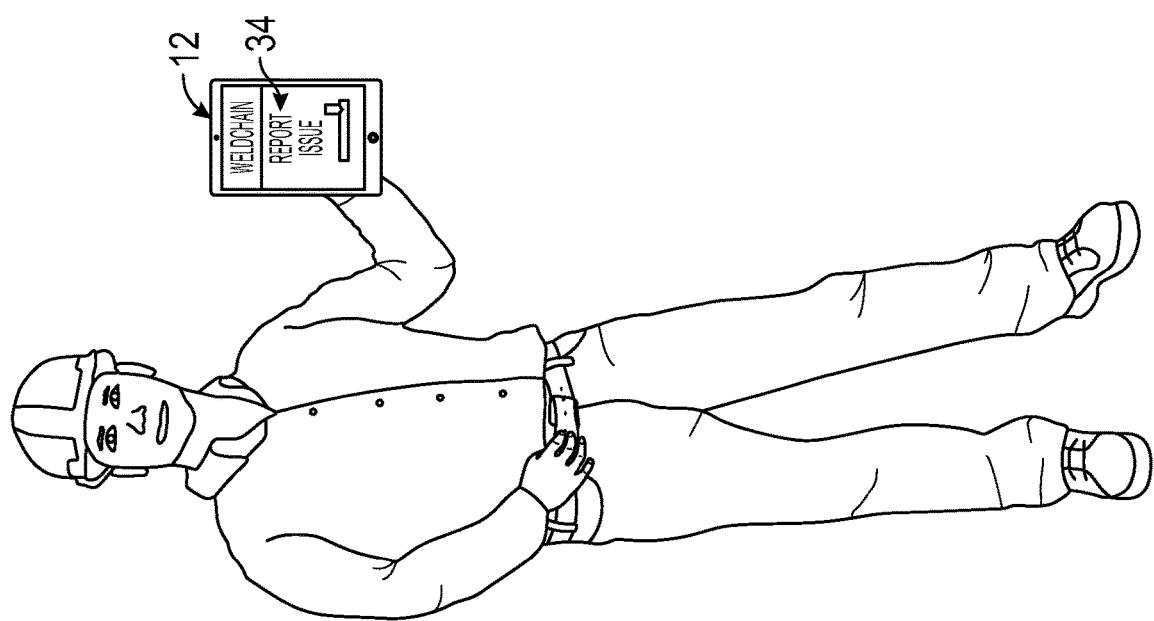
FIG. 9

WELDING DATA TRACKING PLATFORM AND INTERFACE

CROSS REFERENCE TO RELATED APPLICATIONS

This application is a Non-Provisional Application claiming priority to U.S. Provisional Patent Application No. 63/302,291, entitled "Welding Data Tracking Platform and Interface", filed Jan. 24, 2022, and U.S. Provisional Patent Application No. 63/178,747, entitled "Systems and Methods for Weld Information", filed Apr. 23, 2021, which are herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Presently, no single solution exists to the problem of efficiently capturing and storing welding documentation across industries. The cost of weld documentation can meet and sometimes exceed the cost of performance of actual welds. Additionally, to meet local regulations, the documentation of welds is retained over the course of years. Additional problems exist in the welding industry related to matching welders to available job openings as well as timing issues related to inspections, payments, and other factors. It would be beneficial to reduce and/or eliminate problems including the aforementioned issues with respect to the welding industry.

BRIEF DESCRIPTION OF DRAWINGS

FIG. 4 illustrates an example of a first screen of a GUI, in accordance with an embodiment;

FIG. 5 illustrates an example of a second screen of a GUI, in accordance with an embodiment;

FIG. 6 illustrates an example of a third screen of a GUI, in accordance with an embodiment;

FIG. 7 illustrates a table of examples of information that can be supplied to different types of users of the computing network of FIG. 1, in accordance with an embodiment;

FIG. 9 illustrates an example of use of a portion of the platform operating on the computing network of FIG. 1, in accordance with an embodiment.

DETAILED DESCRIPTION

Figure 1:
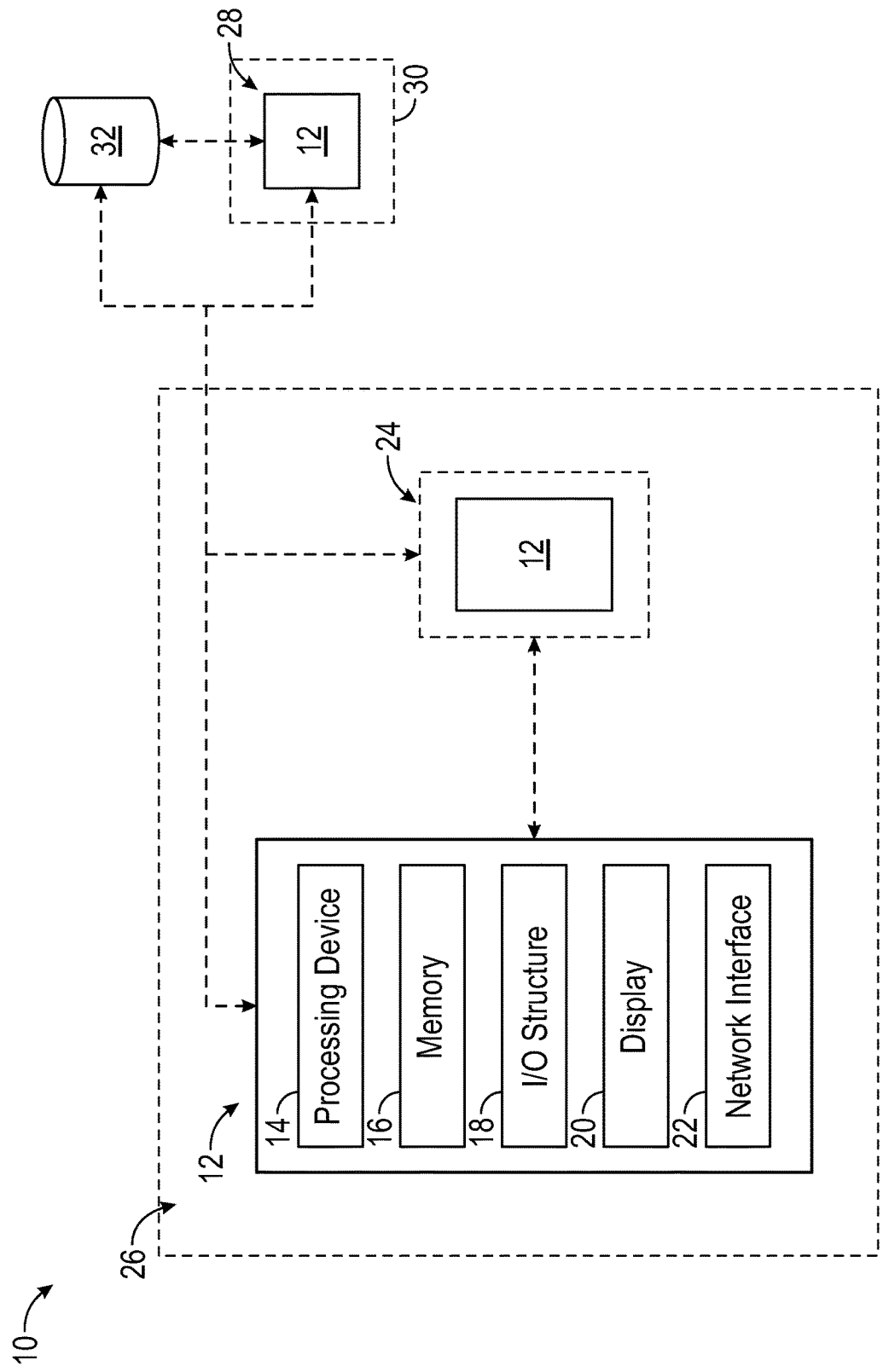
FIG. 1 illustrates an example of an example of a computing network, in accordance with an embodiment.

There is a need for a single solution to welding documentation that is mobile, standardized, and trusted across industries. Weld documentation is estimated to cost as much as performance of the actual welds. Weld documentation is therefore a large market, given that the welding market is forecast to hit $48 billion in 2026.

As discussed herein, a platform is provided for use on both mobile and desktop devices to store digital data relating to welds using blockchain (private and/or public blockchain) and other storage databases. As will be appreciated, this platform may be useful in building and construction, industrial facilities, pipelines, oil and gas, heavy engineering, aerospace, and many other areas.

In present embodiments the platform captures relevant weld data over the life of each weld, including the exact location, facility, all related users, the payment/financial transactions as well as the inspection and repair history of each weld, in a digital format, providing improvements over existing technologies. The platform's fully digitalized record and documentation systems enable predictive maintenance, smart contracting and payment, reduced cost documentation storage and data retrieval solutions, and verifiable performance records across companies and industries, allowing for creation of a wholly new market and system for selecting weld-related services that is currently unavailable with existing technologies.

The platform provides a system for facility owners or other users to outsource and digitize all document retention requirements relating to welds, whether arising from regulation, contract, company preference, or good safety practices. Weld document retention requirements can extend well beyond a decade, and most facility owners want to ensure they have ready access to any and all weld data for the life of a facility. U.S. regulations, for example, can require document retention for as long as 15 years after the performance of a weld and international regulations provide similarly lengthy obligations on facility owners to retain documentation relating to welds. There is currently no standard means by which to secure, across variables and participants, data relating to welds that trace the full lifecycle of welds.

As may be further appreciated through the paragraphs below, welds, weld inspections and weld repairs are ordered and processed through the platform. The platform provides a secure system to collect data on individual welds, weld inspections, and weld repairs as they occur, to include all weld types, welders, inspectors, facilities, owners, other users and other categories across industries.

Data is collected in the platform in a digital format, and can thereafter be used to drive solutions and new service options. The collected data can be blockchain protected, whether through private and/or public blockchains and/or through other databases. This digital-native format of all weld-related data allows for ease of meeting regulation requirements, as documentation is readily available to provide third parties, such as regulators, access to a particular weld, project, set of welds for a given time period, or other groupings as may be selected by a user or the regulator.

Likewise, platform can operate to record items, for example, Welding Procedure Specification (WPS)/Welder Qualification Test/Welder Performance Qualifications (WQT/WPQ)/Procedure Qualification Record (PQR)/Welding Procedure Qualification Record (WPQR) record documentation to automate collection of information for the welding record, simplifying the documentation process for welders, inspectors, owners and regulators. Another feature of the platform is to allow for user interface to allow for uploading of documentation of a weld or an inspection to seamlessly coordinate documentation of the weld into a digitalized record to increase the processing of the data, including capturing a digitalized copy of any hard-copy documentation required by a user with respect to any weld. The use of mobile devices can facilitate this process, and the platform can also be applied remotely to provide virtual reality enabled inspection of welds. Aspects of the platform may be used on welds performed or inspected offsite, including during offsite preassembly of certain sections of piping or pipe spools, and all data performed on such welds while offsite may then be tied through the platform to the precise location of the pipe spool and each of the corresponding welds when installed in the facility.

Further embodiments of the platform are directed to the reporting of data, including weld procedure specification and a weld PQR. This may be accomplished in real time or in near real time and transmitted to construction schedule management systems such as Oracle Primavera/Microsoft Project or other integrated schedule management system, to allow users to monitor performance and track weld progress. Likewise, embodiments of the platform are directed to a graphical user interface (GUI), such as a mobile application that provides the GUI and utilizes profiles and validation of user profile data. Potential categories of user profiles would include: owners (of facilities with welds to be created, inspected, or repaired), welders, inspectors, regulators, or others (e.g., those ordering welds for owners).

Recorded data from a device (such as a mobile device), captured through the program or application, can also be used by quality or safety personnel, inspectors/owners in real time or many years later to review data that could impact the inspection or some safety or quality issue, as that data has been stored via the platform. For example, if a weld has some flaw that can be identified through subsequent analysis, and then immediately compared against part of or the whole data set (e.g., database or ledger), weld failures could be predicted and addressed through predictive maintenance.

The platform data additionally provides a basis to generate specialized reports by, for example, weld, welder, weld type, inspector, facility, customer, geographic or regulatory area, and/or other categorizations. As current weld documentation can be as expensive as performing the actual weld, and can be required by regulations, present embodiments of the platform increase efficiency of sourcing and contracting qualified welders/inspectors, decrease documentation cases by automating and digitizing documentation, and provide a highly scalable solution to track progress, shorten payment time, improve safety and increase data reliability and access as compared to existing technologies. Likewise, the platform operates to provide benefits to the contractor welders who typically locate to a particular job by offering an ability to showcase verified prior weld performance, which allows for owners to select qualified welders to a project.

Thus, present embodiments described herein relate to assisting welders in locating available jobs (i.e., matching welders to job openings) as well as determining qualifications (e.g., experience, historical performance metrics, and the like) of the welders. Additionally, present embodiments operate to reduce time lags for owners to have qualified welders chosen for a particular job as well as have the welders dispensed to the particular job/site. Additional features allow for reductions in the amount of time between performance of a task (e.g., one or more welds) and transmission of and/or receipt of payment to the welder for performance of that task. Likewise, features allow for reductions in the amount of time between performance of a task (e.g., one or more inspections) and transmission of and/or receipt of payment to an inspector for performance of that task as well as assisting inspectors in locating available jobs (i.e., matching inspectors to job openings), which may additionally include determining inspector qualifications (e.g., experience, historical performance metrics, and the like).

Additional features allow for owners to determine when and/or where welds were completed and/or inspected, i.e., to allow for progress to be measured and otherwise determined. Furthermore, weld data may be made available or is otherwise accessible to regulators for a particular weld, site, or the like. Material providers may benefit from present embodiments described herein by receiving notices of non-conforming products. Likewise, weld data and/or inspection data may be made available or is otherwise accessible to insurers or other specified third parties for a particular weld, site, or the like. In some embodiments, all of the data for a given weld is stored in a restricted database and the data itself may be blockchain data (or private blockchain data) that includes all information related to a particular weld. Portions and/or all of the data can be encrypted and/or otherwise hidden from access by unauthorized users, so that only certain parties are able to access the data (or a distributed ledger including the data and similarly accessible data). For example, owners would have one level of permission to the data and/or distributed ledger containing particular data, welders would have a second level of permission, inspectors would have a third level of permission, regulatory authorities would have a fourth level of permission, etc. Likewise, in some embodiments, checks of the data and/or ledger may be executed to confirm that the ledger and/or the data therein have not been altered (or to track alterations, such as authorized alterations which can then become part of the ledger).

In some embodiments, owners or other specified parties will have real time or near real time access to weld progress, for example, via an overlay (e.g., a 3D overlay) of a weld location as well as access to completion status, which may be accomplished in conjunction with color-coded status indicators or other visual indicators and through the use of positional information (GPS or other positional coordinate tracking/locating systems) that may interface with, for example, a mobile device of a welder or other authorized person.

Other implementations of any of the above aspects include corresponding methods, apparatus, and/or computer programs that are configured to perform the actions of the system and/or platform as described above and herein. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein as well as to implement parts and/or an entirety of the platform described herein. As such, the present disclosure describes a platform operating on one or more systems including one or more processors, and a computer-readable storage medium coupled to the one or more processors having instructions stored thereon which, when executed by the one or more processors, cause the one or more processors to perform operations in accordance with implementations of the methods provided herein. In this manner, the platform (as well as portions thereof) can include, for example, one or more software programs, one or more electronic devices, and/or a combination thereof.

The implementations described herein provide at least the following technical advantages and/or improvements compared to previously available techniques. Through use of weld data accumulated over a lifespan of a weld (including, for example, information related to the welder and/or project, maintenance, inspections, etc.), implementations provide an inexpensive, reliable, secure mechanism for accessing weld data and managing weld data, thus making efficient use of processing power, memory, storage space, network bandwidth, and/or other computing resources. Likewise, through use of welder and/or inspector statistics, contracts, and payment systems in conjunction with present embodiments, these implementations similarly provide an inexpensive, reliable, secure mechanism for generation of filtered applicants for positions as well as secure financial transactions between parties (e.g., owners and welders and/or inspectors), thus making efficient use of processing power, memory, storage space, network bandwidth, and/or other computing resources.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

Turning to the figures, FIG. 1 illustrates a computing network 10 that may be utilized in part or in whole to implement embodiments of the presently described platform. As illustrated, the computing network includes a computing system 12. This computing system 12 may be, for example, a portable computing device, such a laptop, a tablet computer, a smartphone, or another portable computing device. Alternatively, the computing system 12 may alternatively represent a desktop computer, a server, or another computing device. It should be noted that portions of the presently described platform may be executed on particular computing systems in the computing network, as will be described in greater detail.

As illustrated, the computing system 12 may be a general purpose or a special purpose computer that includes a processing device 14, such as one or more application specific integrated circuits (ASICs), one or more processors, a microprocessor, or another processing device that interacts with one or more tangible, non-transitory machine-readable medium (e.g., machine readable media, such as memory 16) of the computing system 12 that collectively stores instructions, programs, and the like executable by the processing device 14 to perform the methods and actions described herein. In this manner, the processing device 14 is able to execute computer-executable code, store data, and the like. By way of example, such the memory can comprise RAM, ROM EPROM, EEPROM, CD-ROM or other optical disk storage, magnetic disk storage or other magnetic storage devices, or any other medium which can be used to carry or store desired program code in the form of machine-executable instructions or data structures and which can be accessed by the processing device 14 (e.g., other short term and/or long term storage devices). In this manner, the memory 16 can be any suitable articles of manufacture that represent computer-readable media (e.g., any suitable form of memory or storage) that may store the processor-executable code used by the processing device 14 to perform the presently disclosed techniques.

The computing system 12 may also include one or more input structures 18 (e.g., one or more of a keypad, mouse, touchpad, touchscreen, one or more switches, buttons, or the like) to allow a user to interact with the computing system 12, for example, to start, control, or operate a graphical user interface (GUI) or applications running on the computing system 12 and/or to start, control, or operate, for example, portions of the platform executed on the computing system 12. Additionally, the computing system 12 may include a display 20 that may be an organic light emitting diode (OLED) display, a liquid crystal display (LCD), or another type of display that allows users to view images generated by the computing system 12. The display 20 may include a touch screen, which may allow users to interact with the GUI of the computing system 12 through interaction directly with the display 20. As may be appreciated, the above referenced GUI may be a type of user interface that allows a user to interact with the computing system 12 in conjunction with the present platform through, for example, graphical icons, visual indicators, and the like.

Additionally, the computing system 12 may include a network interface 22. The network interface 22 may include one or more of a Bluetooth interface, a local area network (LAN) or wireless local area network (WLAN) interface, an Ethernet or Ethernet based interface, a cellular network interface that may be coupled to a wireless network, a wired network, or a combination thereof. In this manner, the network interface can allow the computing system 12 to interface with various other devices (e.g., electronic devices), such as a computing system 12 as a site computer 24 (e.g., a worksite computer or other electronic device that operates as a fixed computing device at a facility 26 and can function as a centralized computing device for the facility 26, such as a monitoring device). The network interface 22 also can allow for the computing system 12 to interface with a computing system 12 as a remote computing device 28 at a remote location 30, and/or a database 32, which may be implemented in one or more servers. In some embodiments, the remote computing device 28 at the remote location 30 includes the database 32, whereby the remote computing device may be one or more servers. In some embodiments, platform data may be stored and/or housed in the one or more databases 32. The databases 32 may be communicatively coupled to the computing network 10 that may transmit and receive data to and from the computing systems 12 or as a part of the remote computing device 28.

Thus, as the computing network 10 includes both local and remote devices and in some embodiments, one or more of the illustrated computing systems can be a portion of a cloud-computing system or the like to distribute processes to be performed across multiple computing systems 12. In this case, each computing system 12 operating as part of a cloud-computer may not include each component listed as part of the computing system 12. For example, some of the computing systems 12 may not include the display 20.

Figure 2:
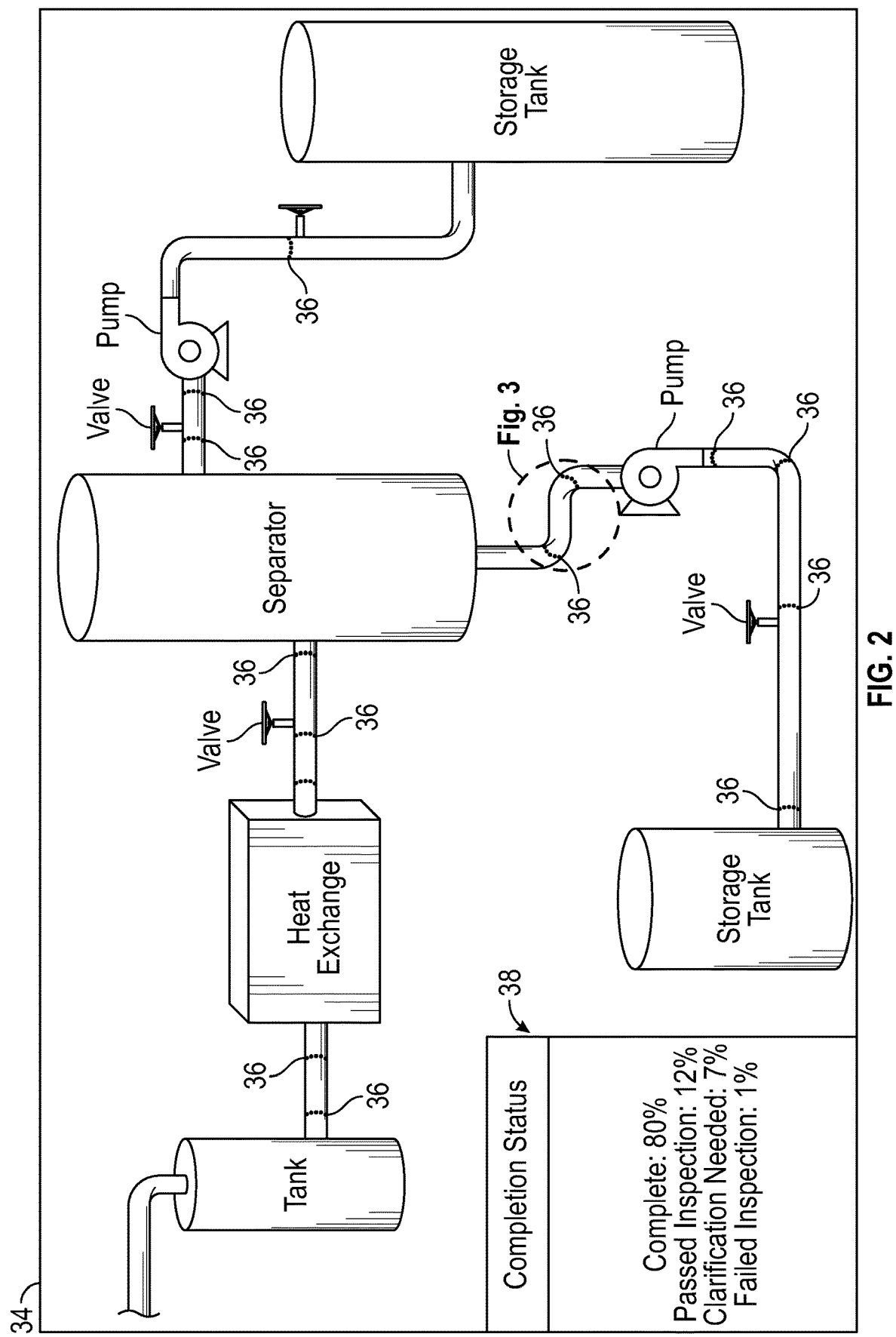
FIG. 2 illustrates an example of an embodiment inclusive of visual indicators representative of different statuses of welds in a facility, in accordance with an embodiment.

One or more of the computing systems 12 may operate to implement a portion of the present platform. For example, tracking of the weld process in the platform can include visualizations of weld progress in real time or near-real time (i.e., live welding progress can be presented to an owner on a mobile or desktop computing device, such as the site computer 24). FIG. 2 illustrates an example of a GUI 34 used in conjunction with present embodiments of the platform to allow for tracking of the weld process. It should be noted that the GUI 34 represents code or a program executed by one or more of the computing systems 12, e.g., by the processing device 14 interacting with one or more tangible, non-transitory machine-readable medium (e.g., machine readable media, such as memory 16) of the computing system 12 that collectively stores instructions, programs, and the like executable by the processing device 14 to perform the methods and actions described herein, including providing the GUI 34 and receiving and processing user inputs and/or other data inputs.

The GUI 34 can include, for example, a visual overlay (e.g., a 3D overlay) of weld locations 36 as well as the completion status thereof. This overlay can be, for example, an overlay of color coded or other status indicators and can include exact coordinates of the weld (i.e., as generated via GPS coordinates from a mobile device of the welder at the weld locations 36 or other proximity determination systems) as part of a graphical representation of an entire facility 26. Likewise, there can be, for example, a status indicator 38 can be presented that includes the total progress of weld completion for a project and/or a facility 26. There can also be, for example, a 4D overlay of the welds using the same procedure in the prior sentence, with the additional dimension of time yielding a video of the progress that would allow a user to visualize how the weld progress 1) is anticipated to proceed, 2) proceeded through some defined time interval, 3) is proceeding in real time; or 4) proceeded over the project from start to finish. FIG. 2 illustrates an example of an embodiment of the platform of an overlay of visual indicators that can include, for example, different colors to represent different statuses of welds at the weld locations. For example, a black indicator or other indication may be used to indicate an ordered weld (i.e., a weld to be completed and/or inspected), a red indicator or other indication can indicate a weld that has failed inspection, a green indicator or other indication can indicate a weld that has passed inspection, and a yellow indicator or other indication can indicate a weld that requires clarification (i.e., an error in the weld or the inspection has occurred or another situation to be attended to). Through the use of these visual overlays, the GUI 34, and more particularly the computing system 12, increases the efficiency with which users can navigate through various views and windows by providing instantaneous or near instantaneous confirmation of the amount of work performed and/or to be performed. Indeed, by providing the overlays, efficient use of processing power, memory, storage space, network bandwidth, and/or other computing resources is accomplished.

Figure 3:
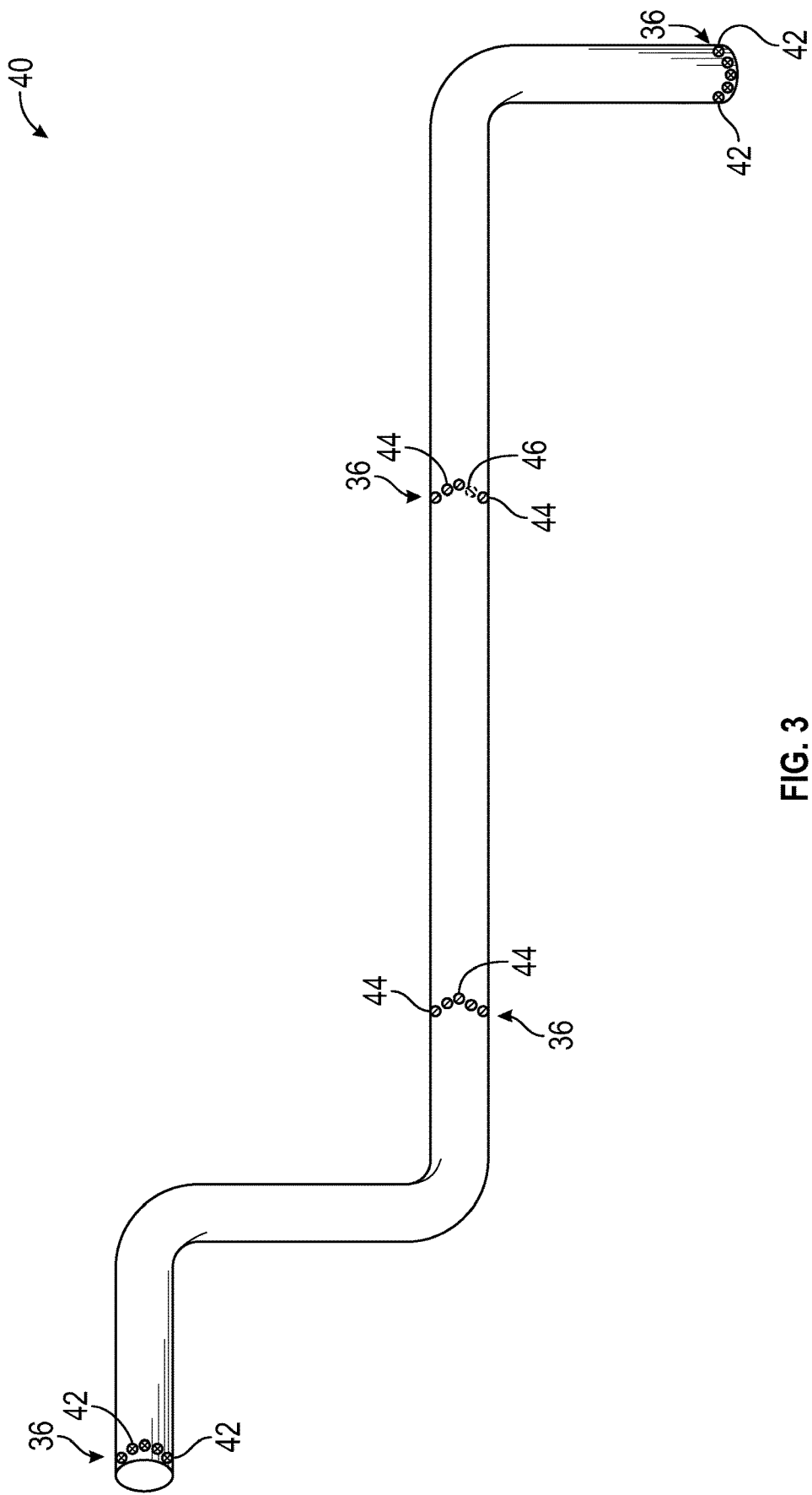
FIG. 3 illustrates an example of an embodiment of a portion of the facility of FIG. 2 with particular visual indicators that represent different statuses of welds.

As a further example FIG. 3, illustrates a portion 40 of the visual representation in FIG. 2 of the facility 26 inclusive of multiple weld locations 36. As illustrated in FIG. 3, overlay of coordinates of each weld can be presented on 3-D representation of the portion 40 of the facility 26 to visualize, using indicators, such as color-coded bubbles (e.g., green represents complete, yellow represents awaiting work or awaiting inspection, red represents fail, black represents ordered, etc.) to view status and progress in simplified representation, which can additionally include a percent completion representation in a simple bar chart. More particularly, indicators 42 can represent completed welds, indicators 44 can represent welds awaiting work or awaiting inspection, and indicator 46 can represent a fail at a weld. Thus, FIG. 3 represents an embodiment of the concept as described, and it should be understood that it can be applied as visualizations of project progress. Likewise, data on subsequent events can be incorporated and utilized to evaluate what welds might require testing/repair based on non-destructive testing (NDT), tensile strength testing, bend testing, metallurgical analysis, etc., or by type (EAS, LASER, MIG, SPOT, ARC, TIG, GAS, other) of weld.

Returning to FIG. 2, the GUI 34 represents an example of a portion of a mobile application ("App") of the present platform. The App is designed to be compatible with various mobile devices, local computing systems, and operating systems that would permit the App or program to use the physical components of the device on which it is executed (e.g., the computing system 12 of the facility 26 of FIG. 1). For example, for a mobile device, the App would be able to access and utilize one or more of the mobile device's GPS, time stamp, camera (potentially broad-spectrum capable, thereby permitting mobile-device component enabled evaluation of whether certain weld procedures or specifications were followed). This can allow the portion of the platform when operated on a mobile device as the App to operate to record data on welds in real time, as well as check operations against a predetermined standard or checklist of operations to evaluate the welds to determine if the workmanship standard has been fulfilled. This has the dual effect of increasing the efficiency with which users can navigate through various views and windows as well as making efficient use of processing power, memory, storage space, network bandwidth, and/or other computing resources, since the App allows for inclusion of otherwise disparate data information to be added to a data entry for eventual storage in the database 32.

The GUI 34 of the platform App has a useful GUI 34 that is readily customizable. The view provided can be tied to a user-type as well as where a user is in the process and what the user is trying to achieve. In some embodiments, one or more of the computing systems when executing portions of the platform include the ability to remotely access and input data as well as to request and order welds, inspections, and/or repairs. The platform also allows for verification or confirmation of that data against the counterparty's data, to allow the users to document completion of their assigned work in through the platform with respect to a particular weld or set of welds, and, as discussed above, with the means by which to claim and/or confirm payment (e.g., a financial clearing house that triggers processing financial transactions once required work was completed, or a condition precedent to payment fulfilled such as reporting completion or passing inspection, or otherwise confirmed by respective user of the platform so that payment is immediately released to the welder, inspector and/or user and documented in the platform and its database 32), thus decreasing the amount of computing resources required to complete the financial transactions and, accordingly, increasing the efficiency of those computing resources.

An example of a screen 48 of the GUI 34 of an App of the platform is illustrated in FIG. 4. As illustrated, the App is being run on a tablet computer as the computing system 12; however, it should be appreciate that alternate devices can instead run the App. As illustrated, the GUI 34 includes icon 50, icon 52, icon 54, and icon 56. Icons 50, 52, 54, and 56 may be user interface icons of the GUI 34 that allow for a user to interact with the GUI 34. Icon 50 may be usable/executable by a contract employee, for example, a welder. Icon 52 may be usable/executable by an owner, manager, or other supervisory user. Icon 54 may be usable/executable by an inspector. Likewise, icon 56 may be usable/executable by a guest or may be removed entirely. One or more of the icons 50, 52, 54, and 56 may be password protected to prevent unauthorized access. Additionally, one or more of the icons 50, 52, 54, and 56 may provide access to different levels of the platform (e.g., the icons 50, 52, 54, and 56 may be tied to restrictions to access of data that correspond to the user logging in).

In this manner, it should be appreciated that selection of various screens and portions of the GUI 34 can be restricted. For example, a user profile may be utilized to access the GUI 34 and can provide access to particular portions of the GUI 34 and that the GUI 34 of the App may be opened by respective users once their profiles have been completed. For example, an owner profile may be associated with an owner (or manager or other supervisor). The owner profile can include attributes such as Owner Profile (legal name, payment/financial information/banking details, project locations, contact info, weld logs (ordered/completed), ability to post welds to be performed, inspected, tested repaired), as well as access to specialized reports on the database of welds analyzed/certified to permit the owner to review performance and potentially inform future decision to increase productivity/safety, weld failure rates, loss of welds, by weld type, by welder, by inspector, by location, or regulated area, etc.), as well as tracking construction progress, maintenance and internal monitoring alerts, and optimize performance and safety through predictive maintenance. Additionally, the owner profile can be restricted when managers or other supervisors log in; the managers and/or supervisors can have less access than an owner, which may be configured for any particular facility 26.

FIG. 5 illustrates an example of a screen 58 in the GUI 34 of an App of the platform when icon 52 is selected by an owner (and, for example, subsequent to any password information being received and verified). The screen 58 is an example of an owner profile for the GUI 34 of the App of the platform and can include, for example, icon 60, icon 62, icon 64, icon 66, icon 68, and icon 70. Icons 60, 62, 64, 66, 68, and 70 may be user interface icons of the GUI 34 that allow for a user to interact with the GUI 34. Icon 60 may be a profile icon as an access to personal and/or professional information of the owner (e.g., name, payment details, facility or project locations, contact info, weld logs ordered/completed, a unique identifier, the ability to post welds to be performed, inspected, tested repaired, etc.), as well as access to specialized reports on welds logged in the platform that have been analyzed/certified to permit the owner to review performance and potentially inform the owner on future decisions to increase productivity. Additional data accessible, for example, through the icon 60 can include financial information/banking details to allow for direct and immediate payment to a welder (or an inspector subsequent to selection of icon 52) or other user once a particular weld or group of welds are completed, have passed inspection, or have satisfied some other particular contractual milestone (as documented in the platform system, database 32, or ledger). Attributes such as previous safety reports, weld failure rates, cost of welds, weld type, etc. can be provided to the owner and a database including sortable and filterable information by welder, inspector, location, regulated area, etc. either through icon 60 and/or through icon 62, icon 64, icon 66, icon 68, icon 70, or another icon.

Icon 62 may be an existing projects icon as an access to current projects that the owner is involved with. Similarly, icon 64 can be a weld log icon and data accessible via icon 64 may include ordered and completed welds for a given project. In this manner, icon 64 may be a weld log icon to provide access to current projects and/or historical projects. Additionally and/or alternatively, icon 64 may provide access to specialized reports on the database 32 of welds analyzed/certified to permit the owner to review performance and potentially inform future decision to increase productivity/safety, weld failure rates, loss of welds, by weld type, by welder, by inspector, by location, or regulated area, etc., as well as to track construction progress, maintenance and internal monitoring alerts, and to optimize performance and safety through predictive maintenance. Icon 66 can be a new project icon that allows for access to new project(s) available from the owner and/or scheduling of tasks on new project(s) for undertaking by welders, inspectors, and the like. Icon 68 is a qualifications icon that provides access to safety statistics, qualifications, and the like for one or both of the owner and/or potential applicants (e.g., welders, inspectors, etc.). Icon 70 may be a statistics icon that may provide access to statistics on previous welds and/or projects commissioned by the owner. Additional and/or alternate icons may instead be provided in addition to or in place of those described above. Moreover, the GUI 34 as described herein provides an increased efficiency with which users can navigate through various views and windows.

FIG. 6 illustrates an example of a screen 72 in the GUI 34 of an App of the platform when icon 50 is selected by a welder (and, for example, subsequent to any password information being received and verified). The screen 72 is an example of a welder profile for the GUI 34 of the App of the platform and can include, for example, icon 74, icon 76, icon 78, and icon 80. Icons 74, 76, 78, and 80 may be user interface icons of the GUI 34 that allow for a user to interact with the GUI 34. Icon 74 may be a profile icon as an access to personal and/or professional information (e.g., name, ID, address, phone, email, company info if not solo, as well as all weld-related certifications, WQTR, qualifications, and licenses to perform welding, weld repair, weld inspection, weld testing, and the like). Additional data accessible, for example, through the icon 74 can include financial information/banking details to allow for direct and immediate payment to a welder (or an inspector for an icon similar to icon 74 accessible subsequent to selection of icon 54) or other user once a particular weld or group of welds are completed, have passed inspection or satisfied some other particular contractual milestone (as documented in the platform system, database 32, or ledger). Further information about the welder can include areas (by state, county, country, or some other geographical limitation) where the welder is qualified to work and is seeking work, possibly broken down by weld type, as well as a unique identifier by individual welder, which may be tied to a personal weld log (e.g., accessible via icon 76, described below). Similarly, weld inspectors, weld testers, and other entities can have similar profiles to the welders. More particularly, certifications/qualifications/licenses by weld type and location for inspecting/testing could be included and tied to data in the platform as well as a personal weld log ordered/completed for that weld inspector/tester, and all associated analytics.

Icon 76 can be a weld log that allows for access to ordered and/or completed welds by the welder. In this manner, icon 76 may be a weld log icon to provide access to current projects and/or historical projects. Icon 78 is a statistics icon that may provide access to statistics on previous welds and/or weld types for the welder. Icon 78 can additionally and/or alternatively provide access to safety statistics, qualifications, and the like. Furthermore, icon 80 can be a new project icon that allows for listing of new projects available to welders and/or inspectors as well as allowing for scheduled for undertaking by the welders and/or inspectors. Additionally and/or alternatively, icon 80 can include scheduling items, qualifications, locational availability, and similar data for the welder that can be used as applicant information by owners in selecting applicants for future projects. Additional and/or alternate icons may instead be provided in addition to or in place of those described above. Moreover, it is envisioned that inspectors can access a screen with similar icons to those described in FIG. 6 modified to specifics to an inspector. Furthermore, the GUI 34 as described herein provides an increased efficiency with which users can navigate through various views and windows.

Thus, the App can include links to data for a welder (or an inspector), such as name, unique identifier, address, phone, email, company info if not a solo welder, as well as all weld-related certifications, WQTR, qualifications, and licenses to perform welding, weld repair, weld inspection, and weld testing cataloged information. Additionally, financial information and/or banking details may be securely stored in the platform, for example, in the database 32 and associated with each respective welder (and inspector) to allow for direct and immediate payment once a particular weld has passed inspection (e.g., as documented in the platform once an assigned inspector passes the weld) or has otherwise met the criteria set forth in the contract with the owner to entitle the welder or inspector to payment. The welder information/data may also include sortable characteristics, such as areas (by state, county, country, or some other geographical limitation) where the welder is qualified to work and/or is seeking work, which can additionally be possibly broken down by weld type. The welder information/data can also include a unique identifier by individual welder, which may be associated through the use of blockchain to connect the welder to their welds to build a historical database for the welder, for example, as located in the database 32. Furthermore, as noted above, weld inspectors and/or weld testers can have the same or similar profiles as welders, including, for example, certifications/qualifications/licenses by weld type and location for inspecting/testing. Weld inspectors and/or weld testers can also have their weld/work histories logged using the platform, for example, as accessed via the App system to connect their work with weld logs ordered and/or completed for that weld inspector and/or tester, with all accompanying analytics.

The present platform and data associated therewith can be applied to create new solutions and service options, including predictive maintenance, improved safety through non-conformity extensions from one non-conforming weld to other welds sharing certain characteristics (e.g., the actual welder, the materials used, the weld procedure, the inspector, or other variables, such as temperature, humidity, or other factors). The collected data on failures or other problems with weld/welds can be applied via smart decisions and/or preventative maintenance to predict failures and other problems in welds that share certain characteristics to allow for proactive maintenance at other weld sites, potential avoiding catastrophic weld failures. Likewise, data may be grouped and analyzed, for example, for a given set of failures, as the history of each weld is available through a database and/or via a private and/or public blockchain, potentially yielding valuable insight such as common aspects of failed welds. For example, for a particular set of weld failures, a common material from a particular order may be identified, allowing for notice to be provided to the material provider of a non-conforming product. Likewise, for a particular set of weld failures, the involved welder or inspector may be identified, allowing for flagging of that welder or inspector so that they can be avoided on future projects. Performance data on individual welders and inspectors for all work documented and tracked by the platform can be recorded in data sets for each project. In this way, the best welders and inspectors can be determined to provide for improvements in hiring decisions for future projects. In this manner, the above methods for data collection, storage, and association of information with data provide an inexpensive, reliable, secure mechanism for accessing weld data and managing weld data, thus making efficient use of processing power, memory, storage space, network bandwidth, and/or other computing resources.

The recorded data from, for example, mobile devices or other computing systems 12, when captured using the App or a similar interface, can be used by inspectors and/or owners in real time, as well as at a later time (even many decades later) to review data that could impact a weld inspection or some safety issue. Moreover, the platform can be utilized, for example via application of analytics or artificial intelligence implemented via the remote computing device 28, to determine if a weld has a flaw that can be identified through subsequent analysis. This analysis can include comparison of the weld with a data set of similar welds in the platform, for example, as stored in the database 32 and performed by the remote computing device 28, which may allow for immediate correction and/or can be used as time goes on to predict and address failures through predictive maintenance. For example, the data can be utilized in for predictive maintenance operations by, for example, predicting expected lifespans of a particular weld based upon collected data, such as the welder who performed the weld and their historical performance, performance of similar welds in similar environments, information about the inspector and/or inspection process. Embodiments of the platform also include use of the data for, and in conjunction with, safety monitoring, for example, by monitoring and/or predicting weld failures using nonconformity information extended from an affected weld to other welds sharing one or more characteristics with an affected weld (e.g., actual welder, materials used, weld procedure, inspector, exposure to conditions, such as temperature, humidity, and the like, and/or other characteristics). The data can similarly be collected for presentation to many third parties for whom the underlying data can drive analytics including, for example, insurance providers as documented examples of advanced predictive maintenance that could mitigate risks and result in lower insurance premiums for facility owners. This again provides an inexpensive, reliable, secure mechanism for accessing weld and/or welder data and managing weld and/or welder data, thus making efficient use of processing power, memory, storage space, network bandwidth, and/or other computing resources.

The documentation recorded in the platform and stored, for example, in the database 32 can be carried through a full life cycle of welds, including participants and all weld data, in real time to allow the owners (or other authorized users) to further track attributes of the weld. The platform, for example, using the remote computing device 28, can compile and transmit specialized (user defined or preprogramed) reports generated from the data. Examples of the data that can be included and/or tracked are data on every weld, construction progress and/or weld-count, performance monitoring (e.g., weld rejection rate and/or pass rate). In some embodiments of the platform, some and/or all of this information may be presented graphically, for example, in conjunction with the view presented previously in conjunction with FIG. 3.

In some embodiments of the present platform, a program or application can operate on or transmit from a first location (e.g., the facility 26) to a second location (e.g., remote location 30) information to allow for a neural network or other artificial intelligence/machine learning (AI) that is running on, for example, the remote computing device 28, to record data on welds and/or potentially evaluate them in real-time or in hindsight to determine if the workmanship standard was fulfilled and/or provide pWPS/WPS/PQR/ wPQR record documentation that is automated. Embodiments also expand this similarly to be applied to current human welders/inspectors with respect to documentation and the system to allow for faster processing, etc., applied to current human welders/inspectors using remote access/VR enabled inspection, with the program and AI performing inspection using weld procedure specifications (WPS) to generate PQR for human welds, with the program and/or AI (e.g., at the remote computing device 28) performing direct or third party inspection/testing of robotic/automated welding against WPS or other standards/requirements, as well as functioning as independent error detection.

FIG. 7 illustrates a table 82 that provides examples of information that can be supplied to different types of users using the present platform, as accessed from the ledger and supplied, for example, on different portions of the GUI 34 as each directed to the specific user. The GUI 34 of the platform itself, or the screens/interfaces provided, would vary based on user-type as well as based upon a step in the process currently being undertaken (e.g., where a user was in the process or based on what the user is attempting to achieve). The GUI 34 of the platform allows for the ability to remotely access and input data to request and order welds/inspections/repairs, to then verify or confirm that data against the counterparty's data, to allow the users to document completion of their assigned work in the program (as well as the ledger, which may be a part of the program or part of a system that includes the respective applications or interfaces therewith) with respect to a particular weld or set of welds, and the means by which to claim/confirm payment (financial clearing house/actually trigger processing financial transaction once required work was completed or when confirmed by the selected user; once inspector documents in the platform establish that the subject weld has passed inspection or satisfy some other contractual milestone, payment immediately released to welder or inspector and is documented in the system, for example, in the ledger or database). The App in some embodiments can include a remote connection or chat function to ask technical questions of particular experts, whether they be employees, owners, or an approved third party that can provide technical advice regarding a particular weld, inspection or repair, allowing for expedited resolution of potential delays, thereby increasing productivity and/or improving quality/safety.

The platform can also provide options for sourcing welding-related materials to the owner, inspector, welders or third parties based upon user elections (or owner requirements) through a marketplace where materials can be ordered and delivered as elected through contractual provisions between users, with payment to the material supplier provided once delivered or when some other contractual milestone has been satisfied and is documented in the platform (for example, in the ledger or database).

Figure 8:
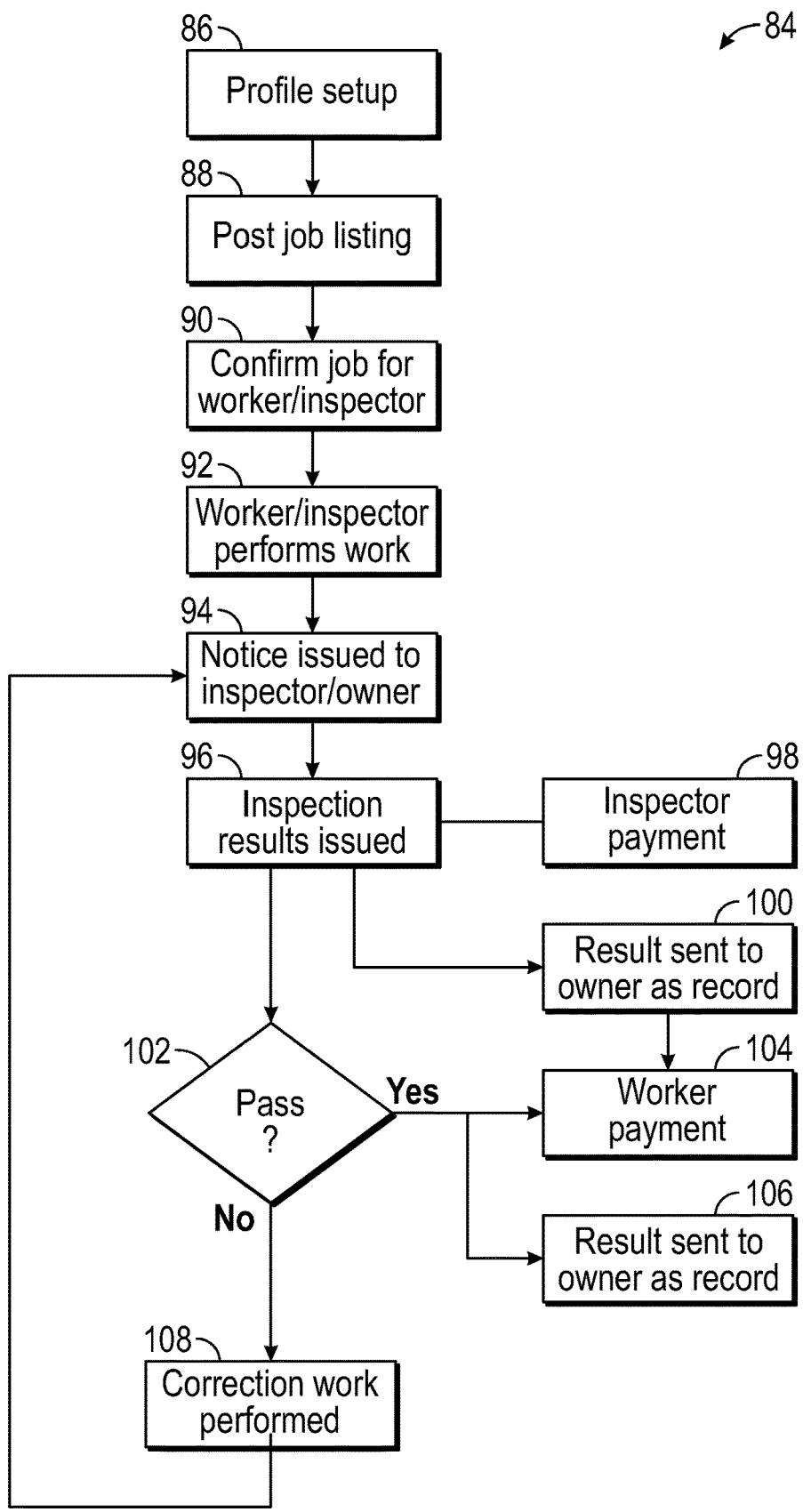
FIG. 8 illustrates a flow chart of transactions and operations in conjunction with a platform operating on the computing network of FIG. 1, in accordance with an embodiment.

In some embodiments, the platform physically stores all data from the local applications and/or systems at particular sites. The storage system may be a machine readable system that can be local to one or more locations and/or cloud based. Transmission of data between the system and the local applications/local systems can be encrypted. Likewise, the data stored in the system can also be encrypted. In some embodiments, the system can host the platform or portions thereof to allow for the processing, analyzing, and/or execution of actions (such as payment/weld rejections/etc.) based on user actions in the applications or local systems. With this in mind, FIG. 8 illustrates a flow chart 84 illustrating various transactions and operations involving one of more of the platform applications or local systems.

The operations can include, in step 86, set up of the various users of the App or local systems, for example, owners and/or contractors, welders, inspectors and/or testers, etc. In conjunction with step 88, the owner can post job listings inclusive of, for example, weld types and or associated information or data, such as job duration, completion dates, etc. Additional information regarding jobs can include whether it includes new and/or repair of welds, the exact locations (e.g., which job sites and/or particular locations at a given job site, which may be pushed or accessed by welders, inspectors, etc. via the App using GPS or other location coordinates once a welder or inspector has been selected for a job). Financial details may also be included in the job listing including bids or prices for the job in total or per type of task. The information regarding the job posting may further include welder requirements related to fail rate, experience at the given type of work to be completed, and/or other data points available in the data/records (e.g., user profile) of a welder or an inspector as stored in conjunction with the platform. The job listing may also include owner or job information, such as a weld dataset, weld procedure specifications (WPS), etc. Welders and inspectors likewise can post their availability and make their profiles available to apply for open positions. This again provides an inexpensive, reliable, secure mechanism for accessing weld and/or welder information (e.g., statistics, histories, etc.) to allow for increased reliability in hiring decisions, which can result in overall reduced use of processing power, memory, storage space, network bandwidth, and/or other computing resources when compared to similar decentralized (or unavailable) attributes.

The job posting from step 88 can be set up to request applications for the job and/or directly select or otherwise contact welders and/or inspectors in the database 32 of the platform that meet the criteria for the job listing. The job posting from step 88 can also provide an open bidding system for the job whereby applicants, individually and/or in groups, respond to an offer of a set amount whereby the first qualified bidders (or using another selection technique) are awarded the job, whereby the applicants enter into a direct auction, whereby the applicants enter into a reverse auction, etc. As part of the job listing of step 88, owners can determine the parameters or qualifications for all applicants (e.g., welders, inspectors, testers, etc.) that are able to participate.

Once the job offer bid(s) have been received, the owner can confirm the job for the applicants (e.g., welders, inspectors, testers, etc.) in step 90. In conjunction with the confirmation, details on logistics, access, timing, location, etc. can be provided to the selected applicants. Thereafter work can begin by the selected applicants in step 92. Once a job has been completed, a worker (e.g., a welder) can upload the results of the weld via the App and in step 94, notice is issued to the owner and/or inspector. In step 96, an inspector can inspect the weld and upload, e.g., via the App, the results. At this point, in some embodiments, in conjunction with step 98, the inspector may be paid using the financial transaction portions of the platform.

In step 100, the results of the inspection are provided to the owner. If the results, from step 102, indicate that the weld passed inspection, in step 104 the welder may be paid using the financial transaction portions of the platform. Additionally, in step 106, the owner may receive an indication updating the data related to the weld that indicates that the weld has passed inspection. If instead, in step 102, the results indicate that the weld did not pass inspection, the welder (and the owner) are informed and in step 108, the welder may correct the weld. Once complete, the welder can upload the results of the weld via the App. This can cause notice to be issued again in step 94 to the owner and/or inspector. Alternatively, once the welder uploads the results of the weld via the App, an inspector is notified and in step 96 the inspector inspects the weld and issues a result.

The selected applicants can utilize the platform, for example, via the App, to access, perform, and document all steps required to complete each finite definable (e.g., each step in a process for job completion) as set up and/or required by the owner. This can include the WPS and can be generated in the owner specified format in the platform. The work performed can include new welds, repairs, inspections and the locations can be matched using GPS coordinates or other location systems to generate exact locations of the work to be performed in a computing device (e.g., smartphone, tablet, etc.) of the selected applicants in the App. In this manner, the App can operate in conjunction with location services of the computing system 12 and/or with a facility 26 specific coordinate reference point or location system. Other factors may be measured or received or otherwise downloaded as inputs to the App during performance of the work, for example, the date, time, temperature, humidity or other work conditions, the materials used, the equipment used, the weld technique, site, specifications, etc. and this data can be associated with the work being performed (i.e., become part of the record generated by the platform for a particular weld).

Indeed, additional aspects related to the weld may be associated with the work being performed (i.e., become part of the record generated by the platform for a particular weld). For example, all portions of the process (from weld to passing of inspection) can have the aforementioned data related thereto included in the record. This process can be performed by a computing system 12 at the facility 26, by the site computer 24 at the facility, and/or by the remote computing device 28 at the remote location 30. Likewise, a qualification record (e.g., PQR) or analogous record can be associated with the record generated for the weld in accordance with owner specifications, including, for example, standards from the American Welding Society (AWS), the American Society of Mechanical Engineers (ASME), the American Petroleum Institute, or the like in a similar manner by the computing system 12, the site computer 24, and/or by the remote computing device 28. The App can utilize computing system 12 (e.g., mobile device) resourced inputs, including, images or video, sounds, etc. These inputs can be taken at all stages of the workflow of FIG. 8, e.g., at the initial, intermediate, and final portion of each step of the performance of work and provided via the App to be associated with a particular record constructed for a particular weld.

The secure financial features of the App and the platform more generally can operate to facilitate faster payments upon completion of work by any participant in the life cycle of a weld upon completion of the conditions precedent to payment, as determined by the contract between parties or through an election (through a drop down selection menu) within the platform. By including financial information in a welder profile and an inspector profile, owners will have the capability in the platform to receive real-time updates and notifications of completion of work and or inspections, or some other agreed condition or metric. Upon receipt of these notifications, the owners can authorize payments to the workers and/or inspectors so that there is minimal delay between completion of a job and payment for the job, and can also provide for immediate payment upon the welder, inspector or other user reporting completion of a scope of work that results in an obligation for the owner to tender payment. This benefits the welders and inspectors as they receive funds more rapidly while allowing the owner to determine the completion status of work items in real time, thus making efficient use of processing power, memory, storage space, network bandwidth, and/or other computing resources.

FIG. 9 illustrates how an owner, inspector, regulator, welder or any user permitted by the facility owner can use the App to report an observed potential safety or quality weld issue in real time while at a facility 26 or project location for evaluation in the platform as determined by the owner or other appropriate user. In such an instance, a user can use the App to select "Potential Safety or Quality Reporting Card—Order Weld Inspection/Testing" on a device (e.g., a computing system 12, including on a mobile device) that records the precise location (and image if selected) of the possible weld safety/quality issue. The resulting actions can be determined by a facility owner or other user, and can include immediate assignment to a weld inspector or other user for evaluation and possibly subsequent action. The incorporation of such real-time improved safety/quality reporting and feedback through the platform can improve safety and quality performance through ease of reporting, documenting, tracking, and acting upon potential safety or quality weld issues and the App thus provides an increased efficiency with which users can navigate through various views and windows as well as a simplified format to report issues in which the App automatically provides additional information (e.g., physical location, history of the weld, etc.) without additional input from the user.

The platform can also access a physical and/or cloud storage system to store all data in conjunction with the App, for example, in the database 32. This stored information can be encrypted for security and may be a closed ecosphere, open ecosphere, or some combination thereof based on owner needs. The platform can also host, process, analyze, and/or execute actions (such as payment/weld rejections/ etc.) based on user actions, for example, received through the App. All documentation recorded in the platform can be maintained via blockchain (private or public or some combination thereof) through the full life cycle of welds, including participants and all weld data, which can be updated in real time to allow operators to track, through the App and/or through specialized reports generated by the platform (e.g., using the computing system 12, the site computer 24, and/or the remote computing device 28) including each of the following:

1) Data on every weld
2) Construction progress+weld-count
3) Performance monitoring (weld rejection rate+pass rate)
4) Weld procedure specifications
5) Overlay of coordinates of each weld on 3-D representation of facility to visualize, using color-coded bubbles to view status and progress in simplified representation, both at fixed intervals and over time through a 4-D (including the progression of welds over time on the 3-D facility) representation of visualized progress.

Through use of weld data accumulated over a lifespan of a weld (including, for example, information related to the welder and/or project, maintenance, inspections, etc.), implementations provide an inexpensive, reliable, secure mechanism for accessing weld data and managing weld data, thus making efficient use of processing power, memory, storage space, network bandwidth, and/or other computing resources. Present embodiments are also directed to systems and methods to secure, across variables and participants, data relating to welds that trace the full lifecycle of welds and, for example, to provide standardization of this data. This can allow for meeting regulatory obligations and, by utilizing the platform, can allow for an opportunity to increase safety, performance, as well as the efficiency by which market participants (owners, contractors, welders, and inspectors) find each other for welding jobs. As welders are typically independent contractors, they often travel between projects. Thus, it can be difficult for the owner and/or contractor to make informed decisions about potential welders hired for a job (i.e., track record, experience with similar welds, etc.) Likewise, it may be difficult for welders to provide a history of their prior work experience to show to potential employers to differentiate themselves and their abilities. Accordingly, present embodiments of the platform include a marketplace for upcoming jobs that can lead to cost savings, greater congruency between welders and the job they are applying for, as well as allow those who offer welds to secure a higher performing welder based on that specific welder's historic performance of welds performed, as documented and archived via present embodiments. Utilizing present embodiments of the platform, an owner and/or contractor would be able to execute directed searches, for example, searching for a welder certified in a particular location for TIG welds with a weld failure rate of <2.5% can be facilitated via the platform (e.g., the GUI 34 and/or the App), such as a drop down menu will allow a user to specify only such welders can bid/accept the job. The platform marketplace system allows for the most reliable and/or highest quality welders and inspectors to showcase their abilities through their associated work histories in the platform, for example, as stored in the database 32. This allows welders and inspectors to stand out and allows owners to be freed from having to rely on unverified information provided by contractors and unverified opinion of certain welders or inspectors. The platform builds a verifiable database of welds and inspections performed so that owners can more reliably select from applicants for an available position. This can reduce the time lag experienced by owners in getting qualified workers on site as well as improve the quality of welders hired for a job, since higher performing welders (based on their prior histories logged in the platform, for example, in the database 32) can be selected for a particular job. Likewise, welders applying for a position can be required to meet these requirements (via historical data associated with the welder in in the platform, for example, in the database 32) before bidding for and/or accepting a job. The platform marketplace can similarly be utilized for inspectors. Owners or others seeking to hire welders and/or inspectors can also offer differential rates for higher performance histories. Thus, through the use of welder and/or inspector statistics and contracts in conjunction with present embodiments, these implementations similarly provide an inexpensive, reliable, secure mechanism for generation of filtered applicants for positions, thus making efficient use of processing power, memory, storage space, network bandwidth, and/or other computing resources.

In conjunction with present embodiments of the platform, all users would have ability to use the platform marketplace to find new work or list new work, with profiles limiting transactions to those criteria set forth by the user ordering the welds/inspection/testing. Likewise, pricing options can be set by the user ordering welds (including through various pricing mechanisms, such a fixed price (per weld inch, per weld type, per hour, including materials or not, etc.), an auction approved price, bundled price, and/or a reverse auction), and those users who have the criteria required by the owner to participate (thereby accessing qualified craft as well as permitting sort and search by information available in the platform, such as safety and/or performance records). Ordered welds can include information which may be represented in the GUI 34 including the type of job offered (e.g., new, inspection, testing, repair, and the like) and location. The location details may be general (e.g., city/state/facility or project location) and/or exact (e.g., an exact location confirmed by welder, on mobile app prior to work, which may be presented using GPS or other location services accessible to a mobile user, such as location services using a local network or input based on center-of-plant orientation points of a particular facility 26). The information for ordered welds can also include, for example, a weld data sheet, weld procedure specifications, available date of work (specific, range, logic schedule-tied, etc.).

Work ordered through the platform may include accessible fields, such as:
1) Type→new
    →inspection/testing
    →repair
2) Location (exact location confirmed by welder, on mobile app prior to work)
3) Weld data sheet
4) Weld procedure specifications
5) Available date of work (specific, range, schedule, etc.)

The platform can also utilize machine learning and/or artificial intelligence (AI) to perform inspections, for example, using WPS to generate PQR for human welds. Likewise, AI, as performed, for example, by the remote computing device 28, can perform direct or third party inspection and/or testing of robotic and/or automated welding against WPS or other standards or requirements. The digital data in the platform provides a data set to allow for artificial intelligence and machine learning to accelerate and improve schedule forecasting, avoid safety and quality issues, and visualize progress both in real time and when evaluating how a project actually progressed against a set forecast schedule. In this manner, the platform provides independent error detection.

The platform can utilize this information to generate user requested specialized reports. For example, there reports can focus on, include, or be sorted by weld, welder, weld type, inspector, facility, customer, geographic or regulatory area, or additional factors. Furthermore, platform data on subsequent events can be utilized to evaluate what welds might require testing and/or repair based on visual inspection, NDT, tensile strength testing, bend testing, metallurgical analysis, etc., or by type (EAS, LASER, MIG, SPOT, ARC, TIG, GAS, other).

With this in mind, present embodiments of the platform described herein relate to assisting welders in locating available jobs (i.e., matching welders to job openings) as well as determining qualifications (e.g., experience, historical performance metrics, and the like) of the welders. Additionally, present embodiments of the platform operate to reduce time lags for owners to have qualified welders chosen for a particular job as well as have the welders dispatched to a particular job/site. Additional features of the platform allow for reductions in the amount of time between performance of a task (e.g., one or more welds) and transmission of and/or receipt of payment to the welder for performance of that task. Likewise, features of the platform allow for reductions in the amount of time between performance of a task (e.g., one or more inspections) and transmission of and/or receipt of payment to an inspector for performance of that task as well as assisting inspectors in locating available jobs (i.e., matching inspectors to job openings), which may additionally include determining inspector qualifications (e.g., experience, historical performance metrics, and the like).

Additional features of the platform allow for owners to determine when and/or where welds were completed and/or inspected, i.e., to allow for progress to be measured and otherwise determined. Furthermore, weld data may be made available or is otherwise accessible through the platform to regulators for a particular weld, site, or the like. Material providers may benefit from present embodiments of the platform described herein by receiving notices of non-conforming products. Likewise, weld data and/or inspection data may be made available or is otherwise accessible via the platform to insurers or other specified third parties for a particular weld, site, or the like. In some embodiments of the platform, all of the data for a given weld is stored in a restricted database and the data itself may be blockchain (private, public, or some combination thereof) data that includes all information related to a particular weld. Portions and/or all of the data can be encrypted and/or otherwise hidden from access by unauthorized users, so that only certain parties are able to access the data (or a distributed ledger including the data and similarly accessible data). For example, owners would have one level of permission to the data and/or distributed ledger containing particular data, welders would have a second level of permission, inspectors would have a third level of permission, regulatory authorities would have a fourth level of permission, etc. Likewise, in some embodiments of the platform, checks of the data and/or ledger may be executed to confirm that the ledger and/or the data therein have not been altered (or to track alterations, such as authorized alterations which can then become part of the ledger).

Figure 10:
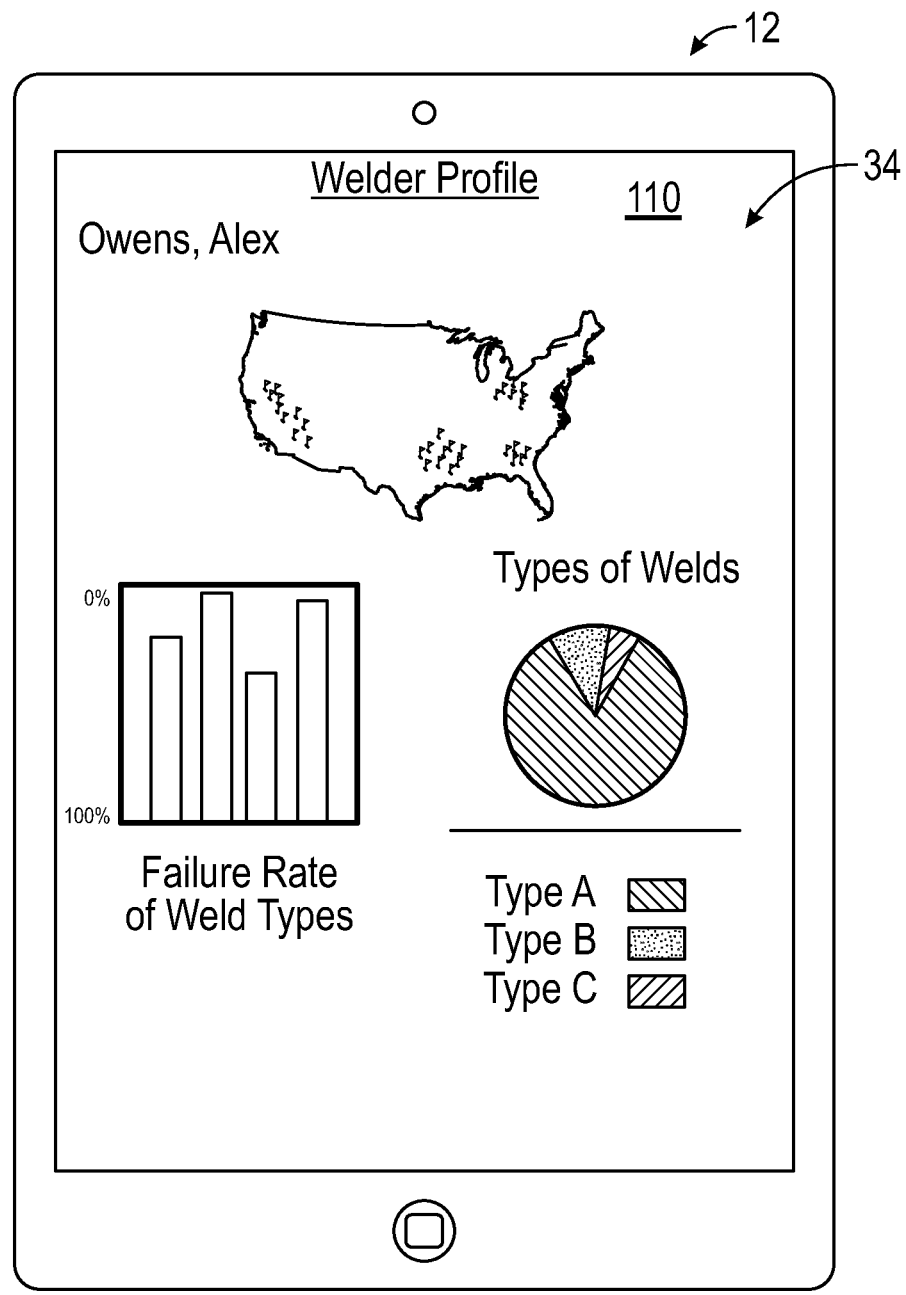
FIG. 10 illustrates an example of a fourth screen of a GUI, in accordance with an embodiment.

As illustrated in FIG. 10, owners can review individual welder or inspector profiles, including weld performance, providing verifiable and trusted data to allow for more objective and reliable basis for selecting welders and/or inspectors. FIG. 10 illustrates an example of a screen 110 in the GUI 34 of an App of the platform when a welder profile is selected by an owner. The platform provides centralization to an otherwise highly decentralized market. The platform additionally provides a technical solution to this technical problem of efficiently sourcing qualified welders and inspectors to contractually agree to perform set weld/inspection jobs through the platform. Moreover, through the use of stored records and verified data of the platform accessible through, for example, the App, there is an increased efficiency with which users can navigate through various views and windows to fill open positions with qualified and screened candidates.

This written description uses examples to disclose the above description to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A device, comprising:
a processor that when in operation:
receives a first signal indicative of completion of action undertaken with respect to a weld;
generates a data log corresponding to receipt of the first signal for addition to a set of one or more previous data logs that correspond to the weld, wherein the data log comprises a first indication of a location of the weld and a second indication of progress of the weld at the location usable in generating a visual indication of the progress of the weld at the location for display via a graphical user interface (GUI) comprising a map of an area comprising the location and additionally depicts one or more additional welds each at a respective location of the area and each having a respective indication of progress in addition to display of the weld at the location having the visual indication of the progress of the weld:
wherein the GUI comprises via a 3D overlay of the weld at the location and the one or more additional welds at each respective location;
wherein the respective progress of the weld and the one or more additional welds comprises visual indicators;
wherein the location of the weld and the respective locations of the one or more additional welds are positioned on the map of the area through the use of positional information for each of the weld and the one or more additional welds to locate the weld and the one or more additional welds;
wherein the GUI comprises a 4D overlay of the weld and the one or more additional welds; and
wherein the 4D overlay comprises the 3D overlay and a video recording of at least one of how progress of the weld and the one or more additional welds is anticipated to proceed, proceeded through a defined time interval, is proceeding in real time, or proceeded over a course of a project from start to finish;
provides a first level of access to the data log based upon a request to access the data log by a first user verified as having a first user profile; and
provides a second level of access to the data log based upon a request to access the data log by a second user verified as having a second user profile, wherein the second level of access to the data log is restricted relative to the first level of access to the data log.

2. The device of claim 1, wherein the processor, when in operation, generates the data log based on the first signal and at least one attribute associated with the weld.

3. The device of claim 2, wherein the attribute includes at least one of time data associated with the completion of the action at the weld and/or date data associated with the completion of the action at the weld, or temperature data associated with the completion of the action at the weld.

4. The device of claim 2, wherein the attribute includes at least one of a first indication of a project comprising the weld or a second indication of a facility comprising the weld.

5. The device of claim 2, wherein the attribute includes at least one of an indication of a welder performing the weld or an inspector inspecting the weld.

6. The device of claim 5, wherein the welder is associated with a first profile in the device comprising first financial information of the welder, wherein the inspector is associated with a second profile in the device comprising second financial information of the inspector, wherein the first financial information of the welder is utilized to trigger processing of a first financial transaction to the welder upon a determination that the second indication of the progress of the weld at the location indicates that first work on the weld was completed by the welder, wherein the second financial information of the inspector is utilized to trigger processing of a second financial transaction to the inspector upon a determination that the second indication of the progress of the weld at the location indicates that an inspection of the weld was completed by the inspector.

7. The device of claim 6, wherein processing of the first financial transaction to the welder comprises immediate payment to the welder, wherein processing of the second financial transaction to the inspector comprises immediate payment to the inspector.

8. The device of claim 5, wherein the welder is associated with a first profile in the device comprising historical data related to weld performance by the welder.

9. The device of claim 1, wherein the processor, when in operation, transmits the data log for addition to the set of one or more previous data logs that correspond to the weld.

10. The device of claim 1, wherein the first user profile corresponds to an owner profile having unrestricted access to the data log, wherein the second user profile corresponds to a welder profile having only partial access to the data log.

11. A method, comprising:
storing a data log corresponding to a weld, wherein the data log includes a record of weld data accumulated over a lifespan of the weld;
receiving a second data log corresponding to the weld, wherein the second data log comprises a first indication of a location of the weld and a second indication of progress of the weld at the location usable in generating a visual indication of the progress of the weld at the location for display via a graphical user interface (GUI) comprising a map of an area comprising the location and additionally depicting one or more additional welds each at a respective location of the area and each having a respective indication of progress in addition to display of the weld at the location having the visual indication of the progress of the weld:
wherein the GUI comprises via a 3D overlay of the weld at the location and the one or more additional welds at each respective location;
wherein the respective progress of the weld and the one or more additional welds comprises visual indicators;
wherein the location of the weld and the respective locations of the one or more additional welds are positioned on the map of the area through the use of positional information for each of the weld and the one or more additional welds to locate the weld and the one or more additional welds;
wherein the GUI comprises a 4D overlay of the weld and the one or more additional welds; and
wherein the 4D overlay comprises the 3D overlay and a video recording of at least one of how progress of the weld and the one or more additional welds is anticipated to proceed, proceeded through a defined time interval, is proceeding in real time, or proceeded over a course of a project from start to finish;
updating the data log with information present in the second data log to generate an updated data log inclusive of the progress of the weld;
storing the updated data log as the data log;
providing a first level of access to the updated data log based upon a request to access the updated data log by a first user verified as having a first user profile; and
providing a second level of access to the updated data log based upon a request to access the updated data log by a second user verified as having a second user profile, wherein the second level of access to the updated data log is restricted relative to the first level of access to the updated data log.

12. The method of claim 11, comprising initially generating the data log as comprising second information related to one of more of a welder who performed the weld, a project associated with the weld, maintenance associated with the weld, or an inspection associated with the weld.

13. The method of claim 12, wherein the information related to the welder who performed the weld comprises financial information of the welder, wherein the financial information of the welder is utilized to trigger processing of a financial transaction to the welder upon a determination that the second indication of the progress of the weld at the location indicates that work on the weld was completed.

14. The method of claim 11, wherein the second data log comprises data associated with the weld, wherein the data comprises maintenance associated with the weld or an inspection associated with the weld.

15. The method of claim 14, wherein the data comprises first financial information of the welder or second financial information of an inspector who inspected the weld, wherein the first financial information of the welder is utilized to trigger processing of a first financial transaction to the welder upon a determination that the second indication of the progress of the weld at the location indicates that first work on the weld was completed by the welder, wherein the second financial information of the inspector is utilized to trigger processing of a second financial transaction to the inspector upon a determination that the second indication of the progress of the weld at the location indicates that an inspection of the weld was completed by the inspector.

16. A device, comprising:
a display that when in operation displays a graphical user interface (GUI); and
a processor coupled to the display and configured to transmit the GUI to the display, wherein the GUI comprises a map of an area comprising a first indication of progress of a first weld disposed at a first location of the area and a second indication of progress of a second weld disposed at a second location of the area:
wherein the first indication is generated based upon a first data log corresponding to the first weld and the second indication is generated based upon a second data log corresponding to the second weld;
wherein the GUI provides a first level of access to the first data log and the second data log via display of a first screen corresponding to a first permission level associated with a first user verified as having a first user profile;

wherein the GUI provides a second level of access to the first data log and the second data log via display of a second screen corresponding to a second permission level associated with a second user verified as having a second user profile;

wherein the second level of access to the first data log and the second data log is restricted relative to the first level of access to the first data log and the second data log;

wherein the GUI comprises via a 3D overlay of the first weld at the first location and the second weld at the second location;

wherein the respective progress of the first weld and the second weld comprises visual indicators;

wherein the first location of the first weld and the second location of the second weld are positioned on the map of the area through the use of positional information for each of the first weld and the second weld to locate the first weld and the second weld;

wherein the GUI comprises a 4D overlay of the first weld and the second weld; and wherein the 4D overlay comprises the 3D overlay and a video recording of at least one of how progress of the weld and the one or more additional welds is anticipated to proceed, proceeded through a defined time interval, is proceeding in real time, or proceeded over a course of a project from start to finish.

* * * * *